US010969338B1

(12) United States Patent
Vunck et al.

(10) Patent No.: US 10,969,338 B1
(45) Date of Patent: Apr. 6, 2021

(54) UV RAMAN MICROSCOPE ANALYSIS SYSTEM

(71) Applicant: Alakai Defense Systems, Inc., Largo, FL (US)

(72) Inventors: Darius Vunck, Largo, FL (US); Robert Douglas Waterbury, Largo, FL (US); Timothy Molner, Largo, FL (US); Ed Dottery, Largo, FL (US); Hunter Hardy, Largo, FL (US); Ryan Robins, Largo, FL (US); Thuyan Conghuyentonnu, Largo, FL (US)

(73) Assignee: Alakai Defense Systems, Inc., Largo, FL (US)

( * ) Notice: Subject to any disclaimer, the term of this patent is extended or adjusted under 35 U.S.C. 154(b) by 0 days.

(21) Appl. No.: 16/789,135

(22) Filed: Feb. 12, 2020

Related U.S. Application Data

(60) Provisional application No. 62/833,315, filed on Apr. 12, 2019.

(51) Int. Cl.
| | |
|---|---|
| *G01J 3/44* | (2006.01) |
| *G01N 21/65* | (2006.01) |
| *G01J 3/02* | (2006.01) |

(52) U.S. Cl.
CPC .......... *G01N 21/658* (2013.01); *G01J 3/0248* (2013.01); *G01J 3/44* (2013.01); *G01J 3/0208* (2013.01); *G01J 3/0237* (2013.01)

(58) Field of Classification Search
CPC ...... G01N 21/658; G01N 21/65; G01N 21/64; A61B 5/007; G01J 3/0248; G01J 3/44; G01J 3/0237; G01J 3/0208
See application file for complete search history.

(56) References Cited

U.S. PATENT DOCUMENTS

| | | |
|---|---|---|
| 7,692,776 B2 | 4/2010 | Treado et al. |
| 8,125,627 B2 | 2/2012 | Dottery et al. |

(Continued)

FOREIGN PATENT DOCUMENTS

WO     2015094512 A1     6/2015

OTHER PUBLICATIONS

Verkouteren, et al., "Automated Mapping of Explosives Particles in Composition C-4 Fingerprints", J Forensic Sci, vol. 55, No. 2, 2010.

(Continued)

*Primary Examiner* — Abdullahi Nur
(74) *Attorney, Agent, or Firm* — McKee, Voorhees & Sease, PLC

(57) ABSTRACT

A method and system for interrogating a target for one or more chemical species of interest using Raman microscopy and spectroscopy. A feature includes the ability to precisely electro-mechanically move and orient a Raman microscope relative to the target with multiple degrees of freedom of movement, including targets with 3-D form factors. This promotes effective detection of minute quantities of chemical species of interest. It also allows effective detection of minute quantities whether the target is static or moving. The method and system can include enhancements. Examples include alternative imaging spectrometers, alternative Raman microscope optical set-ups, and alternative focusing techniques. Others include control of the excitation energy and user controls and options to allow highly adjustable, flexible, and effective detection for a variety of detection applications.

18 Claims, 13 Drawing Sheets
(12 of 13 Drawing Sheet(s) Filed in Color)

(56) References Cited

U.S. PATENT DOCUMENTS

| | | | |
|---|---|---|---|
| 9,052,290 | B2 | 6/2015 | Treado et al. |
| 10,663,404 | B1 | 5/2020 | Babnick et al. |
| 2008/0151241 | A1 | 6/2008 | Lindfors |
| 2009/0135417 | A1* | 5/2009 | Carron .................. G01J 3/0272 356/301 |
| 2013/0128264 | A1 | 5/2013 | Wax et al. |
| 2016/0103073 | A1 | 4/2016 | Ford et al. |
| 2019/0383854 | A1* | 12/2019 | Engel ..................... G01Q 40/00 |

OTHER PUBLICATIONS

Thermo Scientific FirstDefender RM, Product Specifications, Thermo Scientific, 2 pages, 2012.

ACE-ID, Non-Contact Explosives & Narcotics Identifier with ORS Technology, Smiths Detection, 2 pages, 2016.

Verkouteren, Jennifer R., "Particle Characteristics of Trace High Explosives: RDX and PETN*", J Forensic Sci, vol. 52, No. 2, pp. 335-340, Mar. 2007.

Babnick et al., U.S. Appl. No. 16/151,682, filed Oct. 4, 2018.

Verkouteren, "Particle Characteristics of Trace High Explosives: RDX and PETN", Abstract, www.nist.gov/publications/particle-characteristics-trace-high-explosives-rdx-and-petn, 1 page, last accessed on Oct. 4, 2018.

* cited by examiner

*Blurriness Score of 2.75. The nut in the image is blurry and not in focus.*

*Blurriness Score of 78.86. The nut in the image is sharp and in focus.*

US 10,969,338 B1

UV RAMAN MICROSCOPE ANALYSIS SYSTEM

CROSS-REFERENCE TO RELATED APPLICATIONS

This application claims the benefit of Provisional Application U.S. Ser. No. 62/833,315 filed on Apr. 12, 2019, all of which is herein incorporated by reference in its entirety.

GRANT REFERENCE

Work for this invention was funded in part by grants from the Independent Research and Development (IRAD) & Department of Homeland Security (DHS) under contract #HSHQDC-16-C-B0024. The United States government may have certain rights in this invention.

I. BACKGROUND OF THE INVENTION

A. Field of the Invention

The present invention relates to Raman spectroscopy and, in particular, to use of Raman spectroscopy for detection of trace amounts of chemical species on a target.

B. Related Art

Raman spectroscopy has proven valuable for detecting chemical species non-destructively and without substantial disruption of a target (e.g. without destructively or otherwise removing a sample from the target object, surface, or area). An electromagnetic excitation energy (e.g. a laser) can be pointed at a surface of a target at stand-off distances of inches to many meters, and Raman scattering collected. Collected Raman spectra can be compared with calibration models for correlations to specific chemical species. One application of particular interest and benefit is in detection of explosives. As explained in detail in International Patent Publication WO 2015/094512 A1, published Jun. 25, 2015, incorporated by reference herein, relatively quick, stand-off, and sometimes discrete scanning of targets is possible. Examples are scanning for Improvised Explosive Devices (IEDs), or chemicals indicative of explosives on clothing, shoes, human hands, luggage, packaging, and so on. While there are challenges to extracting reliable Raman signal from noise in Raman scattering, it can reveal even trace amounts of explosive material on a scanned surface.

One technique is illustrated in FIG. 1A, which is taken from U.S. Pat. No. 7,692,776 issued Apr. 6, 2010, and incorporated by reference herein. A static (e.g. table or bench top) Raman detector setup 1 has the excitation source 5 and Raman scattering collector 4, and processor 2 in place in a housing 3. A target 9 (e.g. human hand, package, luggage, etc.) is brought to the scanner 1. This usually works for relatively flat and smaller sized targets; ones that can be manipulated into a protective hood 6 at the static set-up 1. It also requires the target 9, once in place at the set-up, to be static. It also requires manual handling to position the target in the correct orientation relative to the excitation source, which typically has a focused spot size at the surface of the target. This example has a display 2 with an image of the target displayed to the user.

Another technique and set-up 10 is illustrated in FIG. 1B which is taken from co-owned, co-pending U.S. Ser. No. 16/151,682, incorporated by reference herein. A portable excitation source and scattering collector 14, and processor 12, can be moved relative a target 19. In some cases, the target or the Raman set-up can be moving relative to the other, or both can be moving. The Raman set-up 10 can be carried on a person or a vehicle. As shown in FIG. 1B, it can have a hand-held or aimable optical portion which allows the excitation beam and field-of-view of the scattering collector optics to attempt to be accurately pointed and focused to a focus point 18 on the relevant surface of the target 19 for effective excitation of 15 and collection of Raman scattering 17. Cable 16 communicates with processor 12 in housing 13. In this example, a display 11 shows relevant images or data to a user. These set-ups can be beneficial for larger stand-off distances (e.g. meters to tens or hundreds of meters). But there can be difficulties in both getting the excitation beam focused on a relevant part of the target, and getting useful Raman signal out of the scattering.

Thus, the inventors have recognized there is room for improvement in this technical field. In particular, they have identified a need for the ability to have substantial flexibility in aiming and viewing angle of a target, especially targets that have substantial three-dimensional features or form factors. This flexibility includes efficiently, accurately, and effectively changing Raman microscope proximity, aiming direction, and viewing angle for the same target (e.g. to scan or move to various surfaces on the same target), including targets that are moving relative to the excitation source and Raman collector. Furthermore, they identified a need for a method and system of acquisition of Raman scattering that is capable of effective Raman signal for even extremely small trace chemicals; down to nano-scale particle size.

As is demonstrated by the incorporated by reference references cited above, there are a number of competing factors in utilizing Raman scattering to attempt to non-destructively detect chemical species. For example, it is beneficial to be accurate and precise on aiming the excitation source to a relevant target surface and collecting scattering that reveals a good Raman content. This favors a stable static bench top system. But, as mentioned, this can limit the nature of samples that can be scanned. On the other hand, scanning targets for explosives favors larger stand-off distances. This can present significant challenges to not only getting a good Raman signal out of the return but getting an accurate focus of the excitation source on a relevant surface of a distant target.

As such, these competing and sometimes agnostic factors, present challenges and unpredictability when trying to satisfy such competing factors.

II. SUMMARY OF THE INVENTION

A. Objects, Features and Advantages

It is therefore a principal object, feature, or advantage of the present invention to provide methods, systems, and apparatus which improve over or solve problems and deficiencies in the state of the art.

Further objects, features, and advantages of the invention include one or more of a Raman-spectroscopy-based approach which:

a. allows for the sample to either be stationary or moving at a slow rate of speed;

b. allows for scanning of irregular 3-D surfaces as most real-world objects are; and c. allows for access to a larger surface are or portion of the sample than a standard line-of-sight optical system.

d. provides for a variety of optional enhancement features that can improve resolution, accuracy, or effectiveness of detection, including very small trace amounts without degradation or destruction of the trace amounts or particles.

B. Aspects

One aspect of the invention is a method of interrogating a target for one or more chemical species of interest using Raman microscopy. A feature includes the ability to precisely electro-mechanically move and orient a Raman microscope relative to the target with multiple degrees of freedom of movement, including targets with 3-D form factors. This promotes effective detection of minute quantities of chemical species of interest. It also allows effective detection of minute quantities whether the target is static or moving. Techniques can be used to effectively position, orientate, focus, and operate the Raman microscope for detection of even minute traces of chemical species of interest.

The method can include enhancements. One example is the ability to use alternative imaging spectrometers to take advantage of benefits of a particular imaging spectrometer for a given detection application. Another example is the ability to use alternative Raman microscope optical set-ups to take advantage of benefits of one over the other for a given application. Another example is alternative focusing techniques. Again, one can be selected over another based on advantages/disadvantages relative to a particular detection application.

Additional enhancements are possible. One example is control of the excitation energy. This can deter degradation or destruction of either chemical species of interest or the substrate/target surface they are on to promote more effective Raman detection. Another example is a user control interface and options to allow highly adjustable, flexible, and effective detection for a variety of detection applications.

A further aspect of the invention is a system which can include one of more of the methodology techniques described above. The designer can select the specific components to be used with an electro-mechanically-controlled positioner that has multiple degree freedom of movement. The positioner can effectively move a Raman microscope relative to a target, including targets that have substantial 3-D features and/or are moving, such as along a conveyor.

A further aspect of the invention is a method or system that can combine the electro-mechanical Raman microscope control with one or more enhancements or alternatives, as well as change between alternative or options, depending on each detection application.

These objects, features, advantages, and aspects of the invention will become more apparent with reference to the accompanying specification and claims.

III. BRIEF DESCRIPTION OF THE DRAWINGS

The patent or application file contains at least one drawing or photograph executed in color. Copies of this patent or patent application publication with color drawings(s) will be provided by the Office upon request and payment of the necessary fee.

FIG. 1A is a diagrammatic view of a prior art stationary Raman spectroscopy system that analyzes a specimen (here a human hand) that is movable relative to the static system. This system is from U.S. Pat. No. 7,692,776 B2, issued Apr. 6, 2010, and incorporated by reference herein as background information.

FIG. 1B is a perspective view of a portable UV Raman system that can be manually moved relative to a static target (here a duffle bag). This system is co-owned by the owner of the present application and found at co-pending U.S. Ser. No. 16/151,682, filed Oct. 4, 2018, and incorporated by reference herein.

FIG. 2 is a perspective view of a system according to an exemplary embodiment of the present invention. The UV Raman system and its target (a duffle bag handle) are enlarged in the detail view.

FIG. 3 is an example of a consolidated display from a scan of a target by the system of FIG. 2, including indication of detection of Potassium Nitrate powder or traces (KNO3) on the target, microscope images of the target, and other details about the detection. In this example of proof of concept, the data was taken on a UV Raman microscope setup such as FIG. 2 showing detection of a ~130 nanogram (ng) KNO3 particle.

Figure 4A:
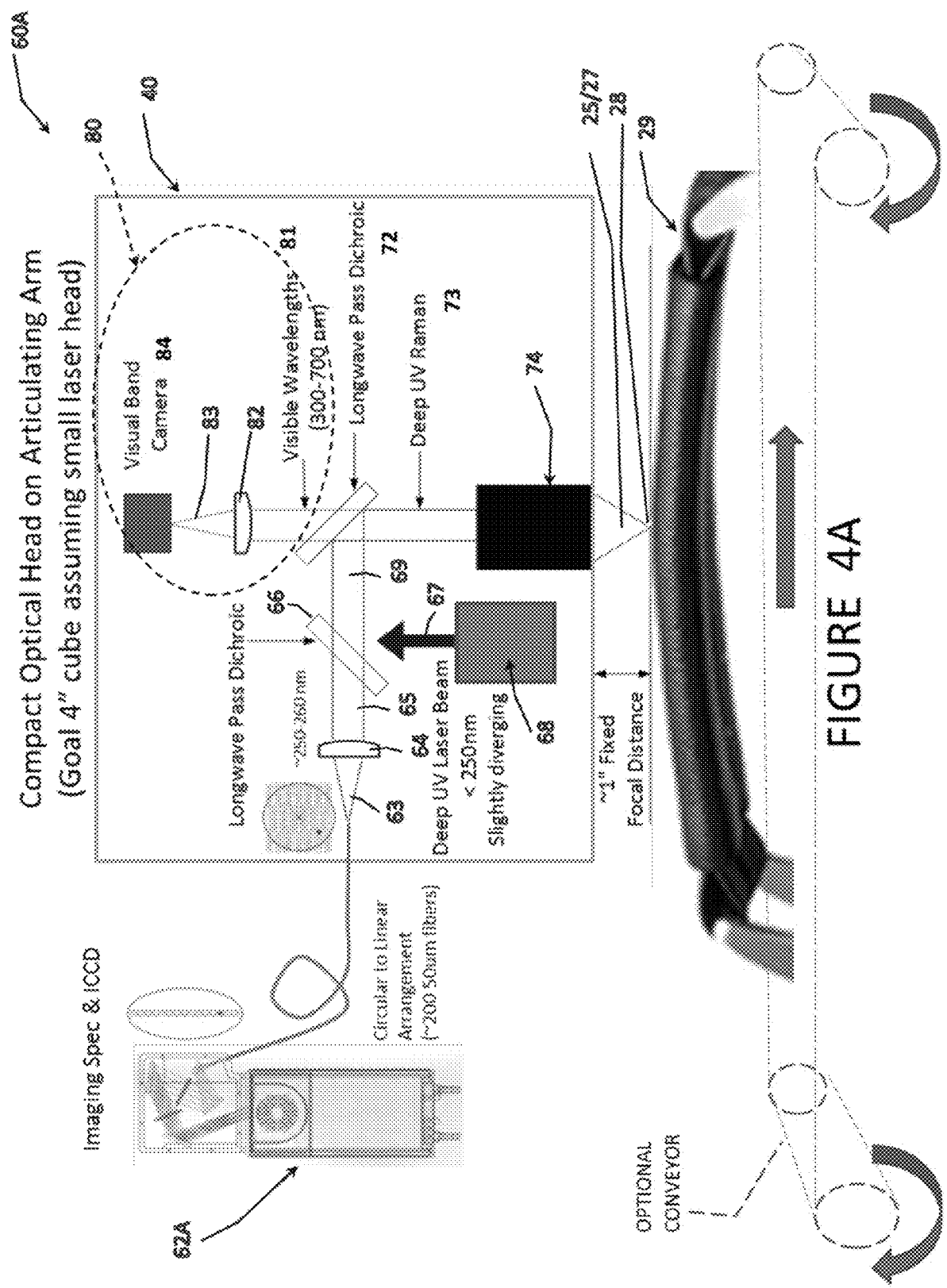
FIG. 4A is a diagrammatic view of a first specific exemplary embodiment according to the invention (sometimes called version 1), namely a diagram of the optical design for what will be called the coaxial laser illumination approach.
Figure 4B:
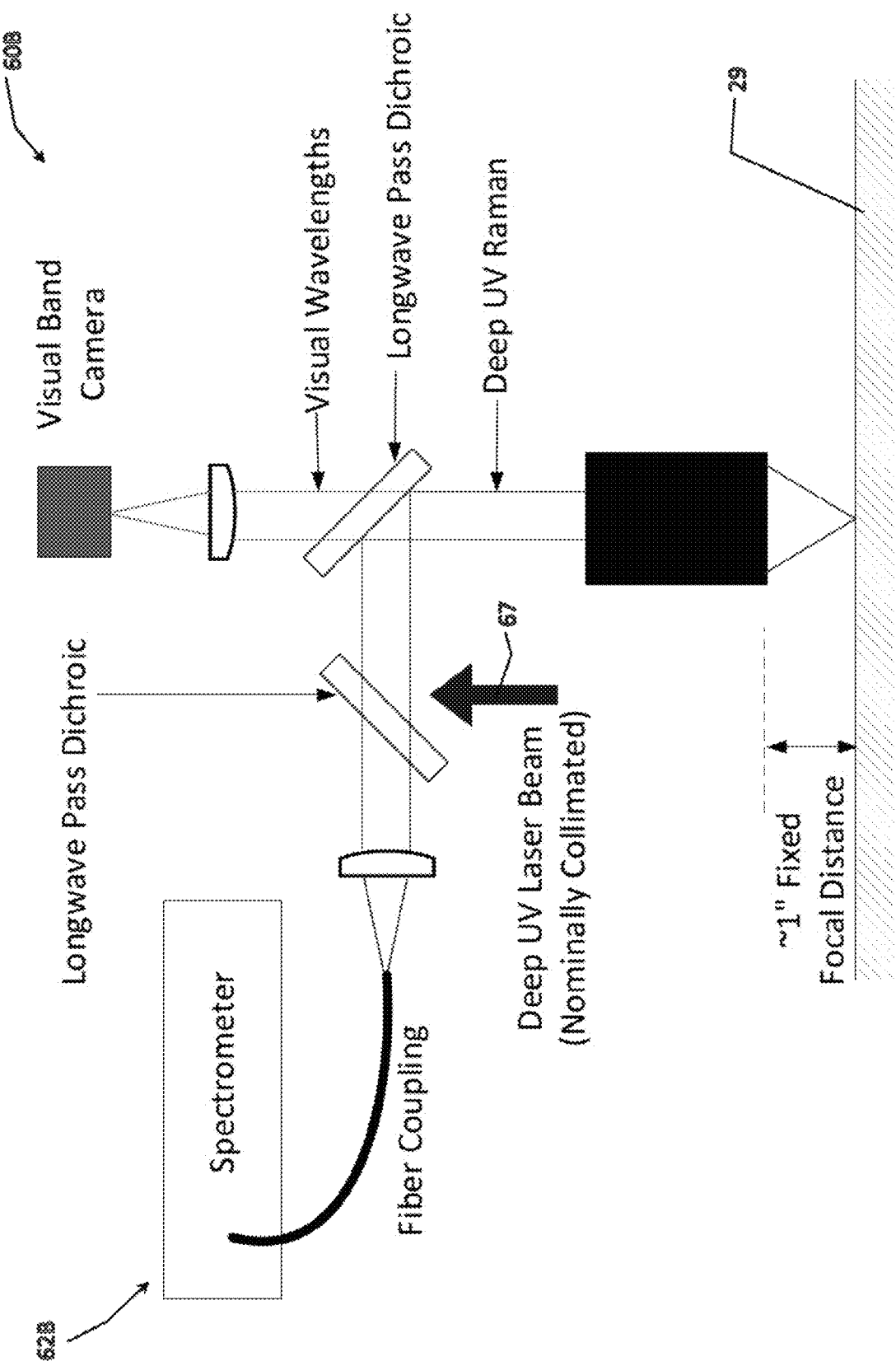
FIG. 4B is a diagrammatic view of a second specific exemplary embodiment according to the invention (sometimes called version 2), namely a diagram of what will be called a Scanning Raman Microscope.
Figure 4C:
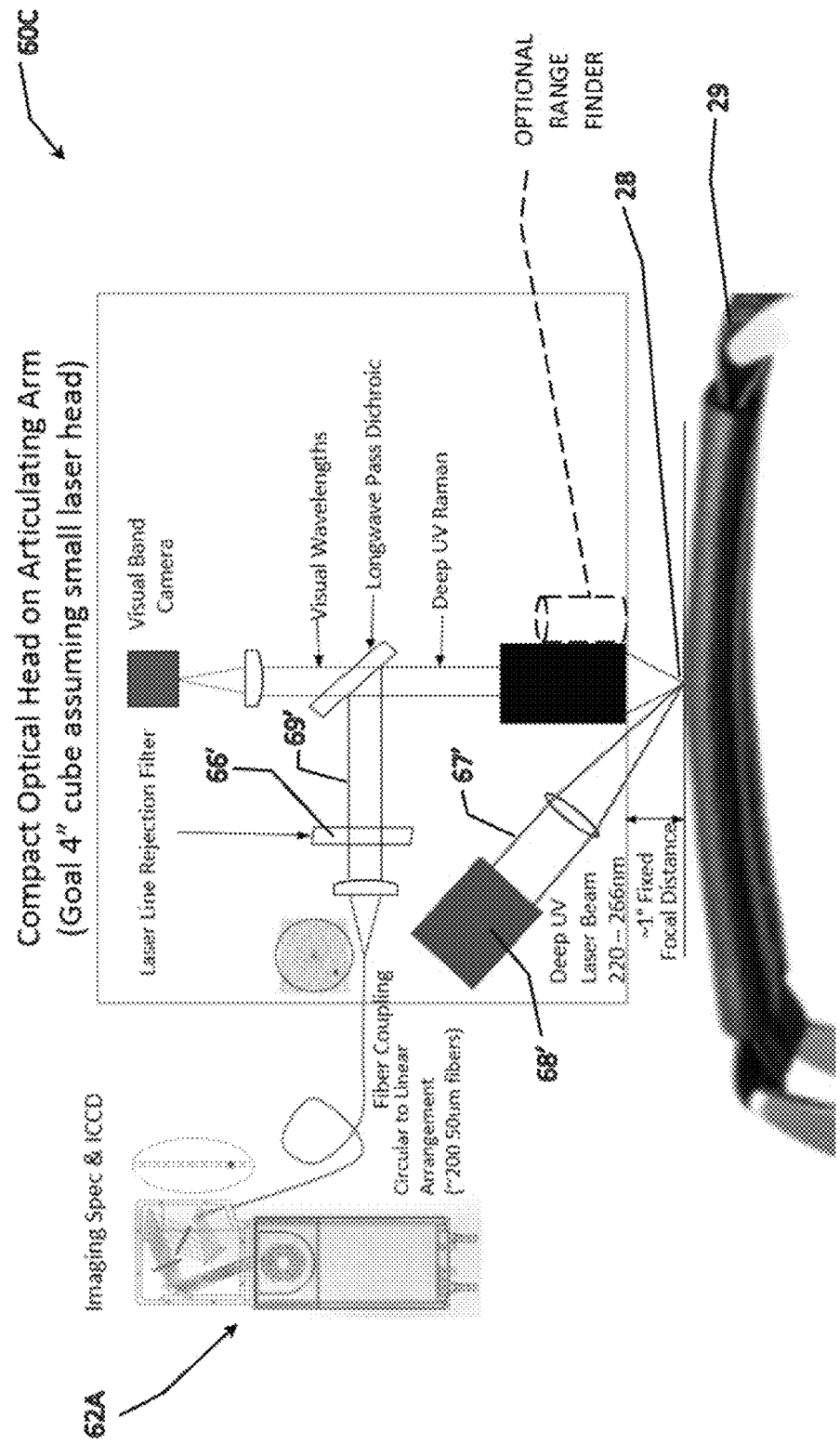
Figure 5:
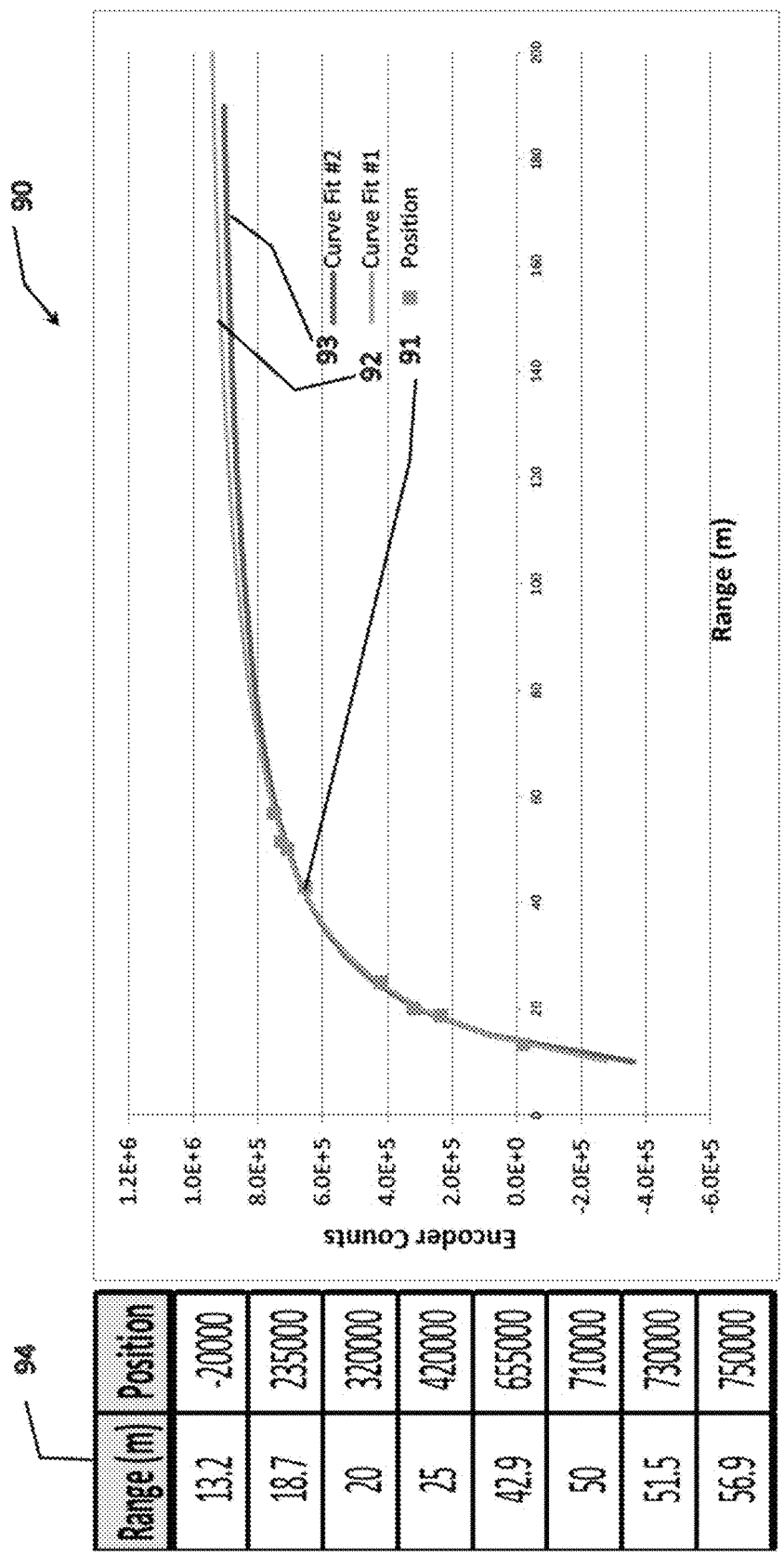

FIG. 4C is a diagrammatic view of a third specific exemplary embodiment according to the invention (sometimes called Approach 2: Oblique UV Laser Illumination), FIG. 5 is a graph and data providing a representative range vs. position plot with a curve fitted characteristic equation used with an optional range-finder-based focusing technique that can be used according to aspects of exemplary embodiments of the invention.

Figure 6:

FIG. 6 is a photograph illustrating an alternative optional visual focusing technique that can be used according to aspects of exemplary embodiment of the invention; here illustrating quantification of what is called a "blurriness score" when imaging a target, here showing a low blurriness score which indicates lack of focus.

Figure 7:

FIG. 7 is a photograph illustrating the focusing technique via blurriness score as in FIG. 6; here showing a high blurriness score which indicates good focus.

Figure 8:
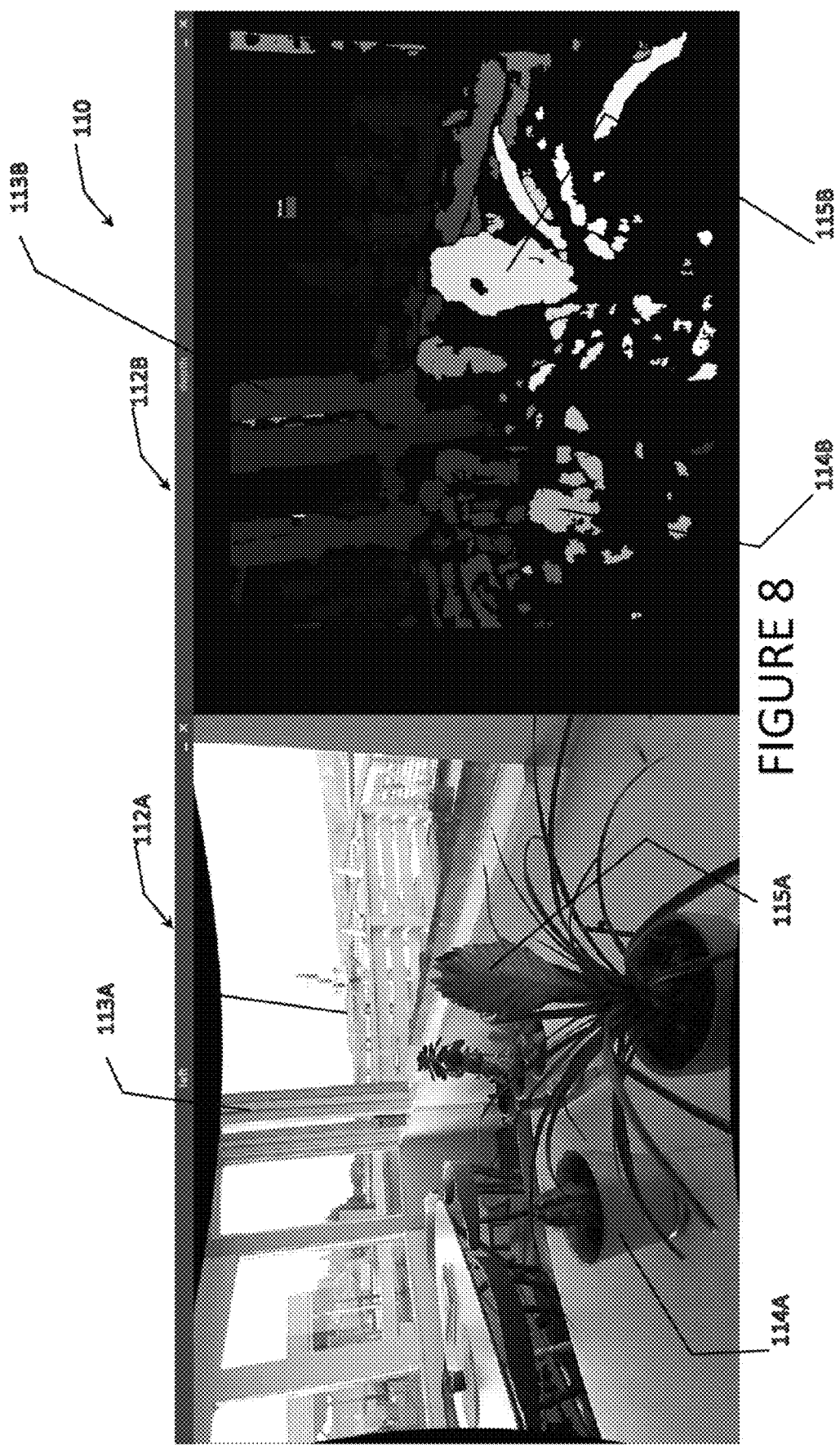

FIG. 8 is, for comparison, side-by-side stereoscopic output contemporaneous-acquired images of the same target. The left-side image is a normal photograph of the target and background scene. The right-side image can be used to show depth of field. Brighter white objects are closer than darker objects.

Figure 9:
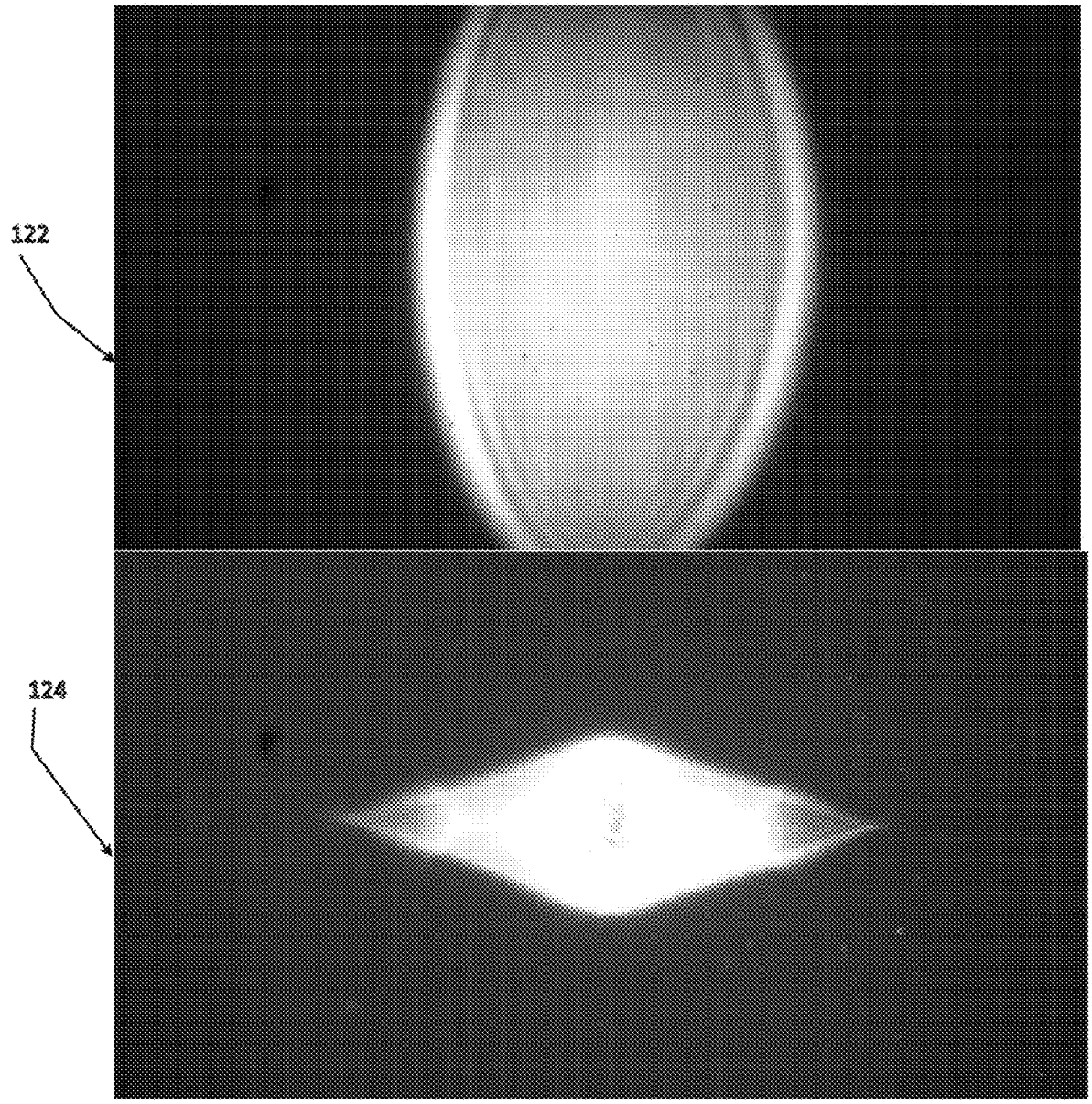

FIG. 9 is, for comparison, adjacent highly magnified acquired images that demonstrate features according to aspects of the invention; namely (top) a defocused laser of size roughly 400 um×750 um, and (bottom) a focused laser of size roughly 250 um×80 um.

Figure 10:
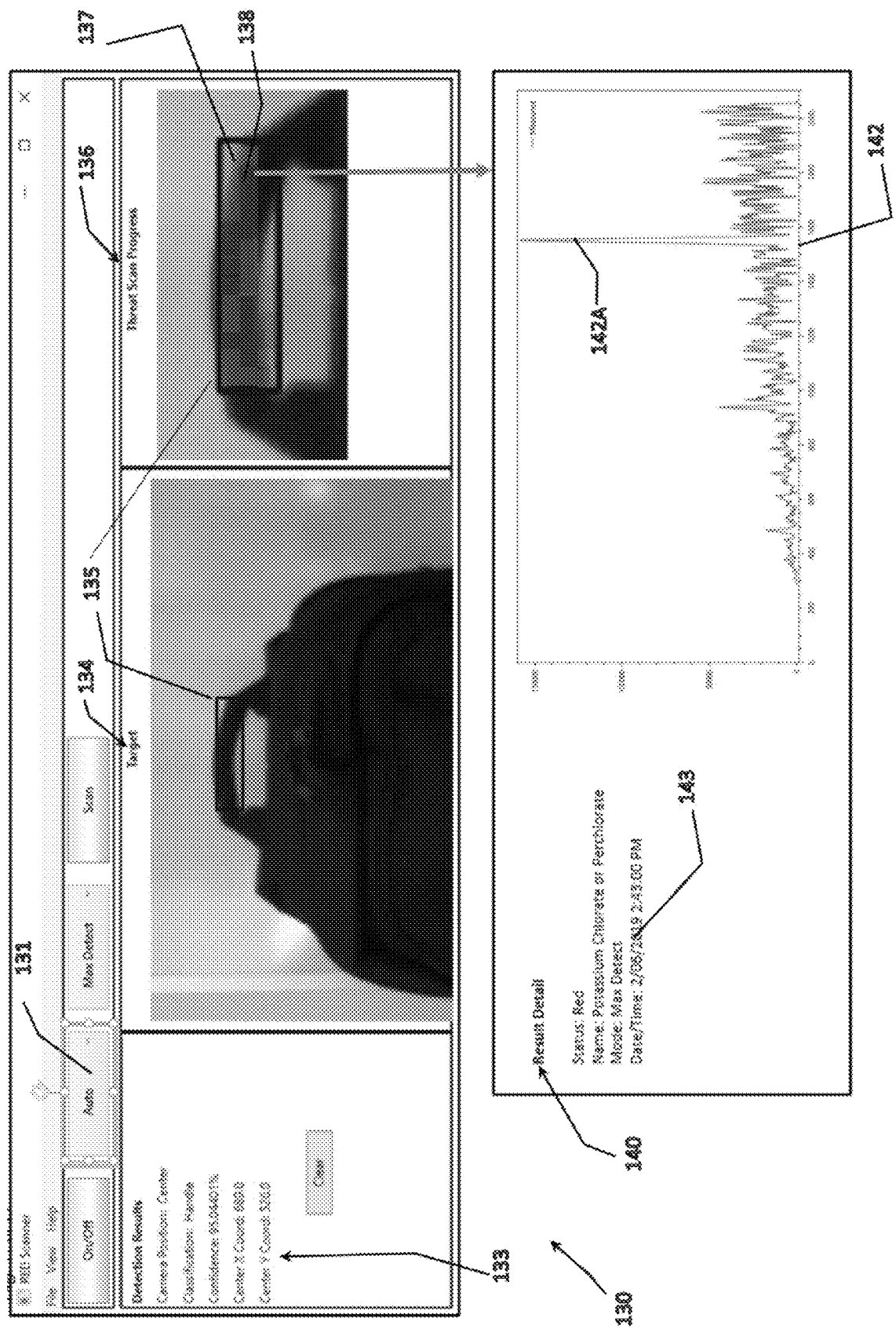

FIG. 10 is examples of screen displays of results from use of methods and systems according to the present invention, namely (top) what will be called an Auto Mode with Overlay Result Feedback and (bottom) what will be called a Spectra Plot acquired from a target.

Figure 11:
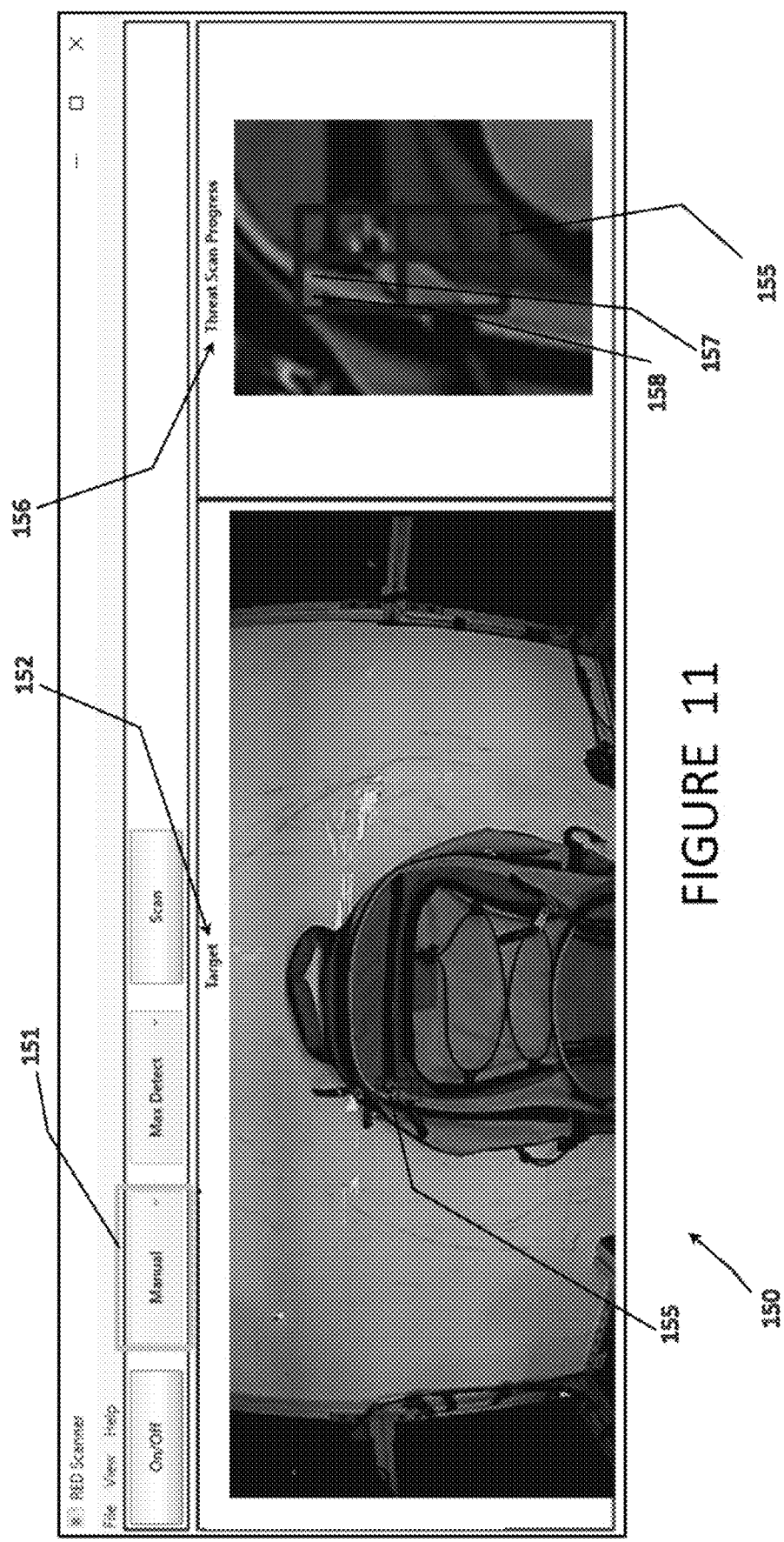

FIG. 11 is an example of a screen display useful with methods and systems according to aspects of the present invention, namely (left side) what will be called a Manual Mode with (right side) what will be called a Touchscreen Input Bounding Box.

IV. DETAILED DESCRIPTION OF EXEMPLARY EMBODIMENTS OF THE INVENTION

A. Overview

For a better understanding of the invention, non-limiting examples of several different forms and embodiments the invention can take will now be described in detail. It is to be understood that these examples are neither exclusive nor inclusive of all forms and embodiments possible with the invention.

For example, exemplary embodiments discussed below will focus upon detection of explosive such as potassium nitrate (KNO3) as a chemical species of interest. Those skilled in the art understand that the invention can be applied to any number of other chemical species for any number of purposes so long as they can be extracted from Raman scattering. For example, there can be other chemical species of interest to be detected relative to explosives for public, private, security, or military purposes. But there can be non-explosive chemical species of interest that could benefit from aspects of the invention. One example is detection of a pesticide or insecticide on fruit or vegetables.

By further example, exemplary embodiments utilize a particular UV laser as an excitation source. As known to those skilled in the art, a variety of excitation sources are possible. Still further, exemplary embodiments utilize an excitation source that is designed to generate Raman scattering from the target, and isolate an effective Raman signal from a collected portion of that scattering for identifying chemical species of interest with sufficient accuracy, precision, reliability per target and repeatable for a substantial number of targets over a substantial useful life.

B. Generalized Embodiment

Figure 1A:
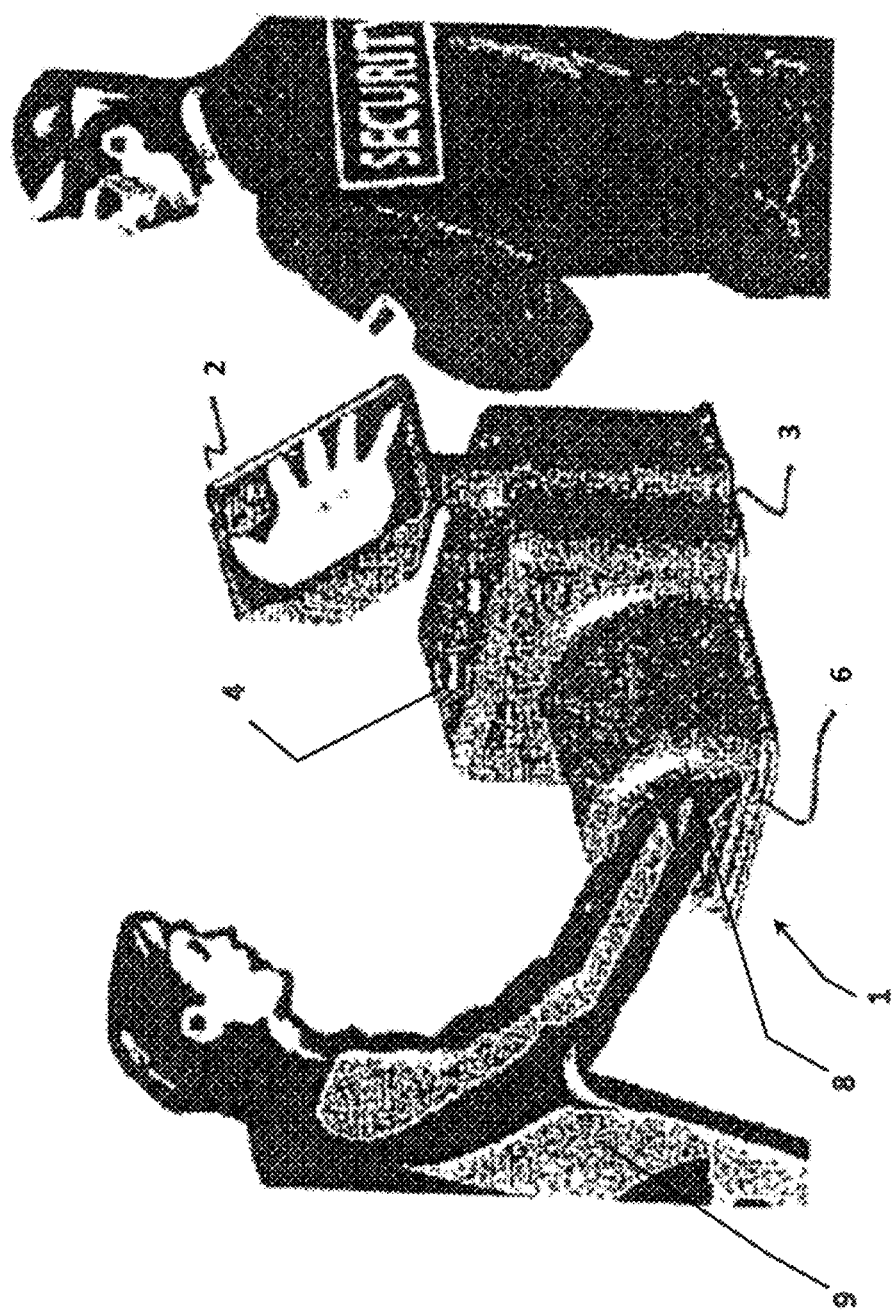
Figure 1B:
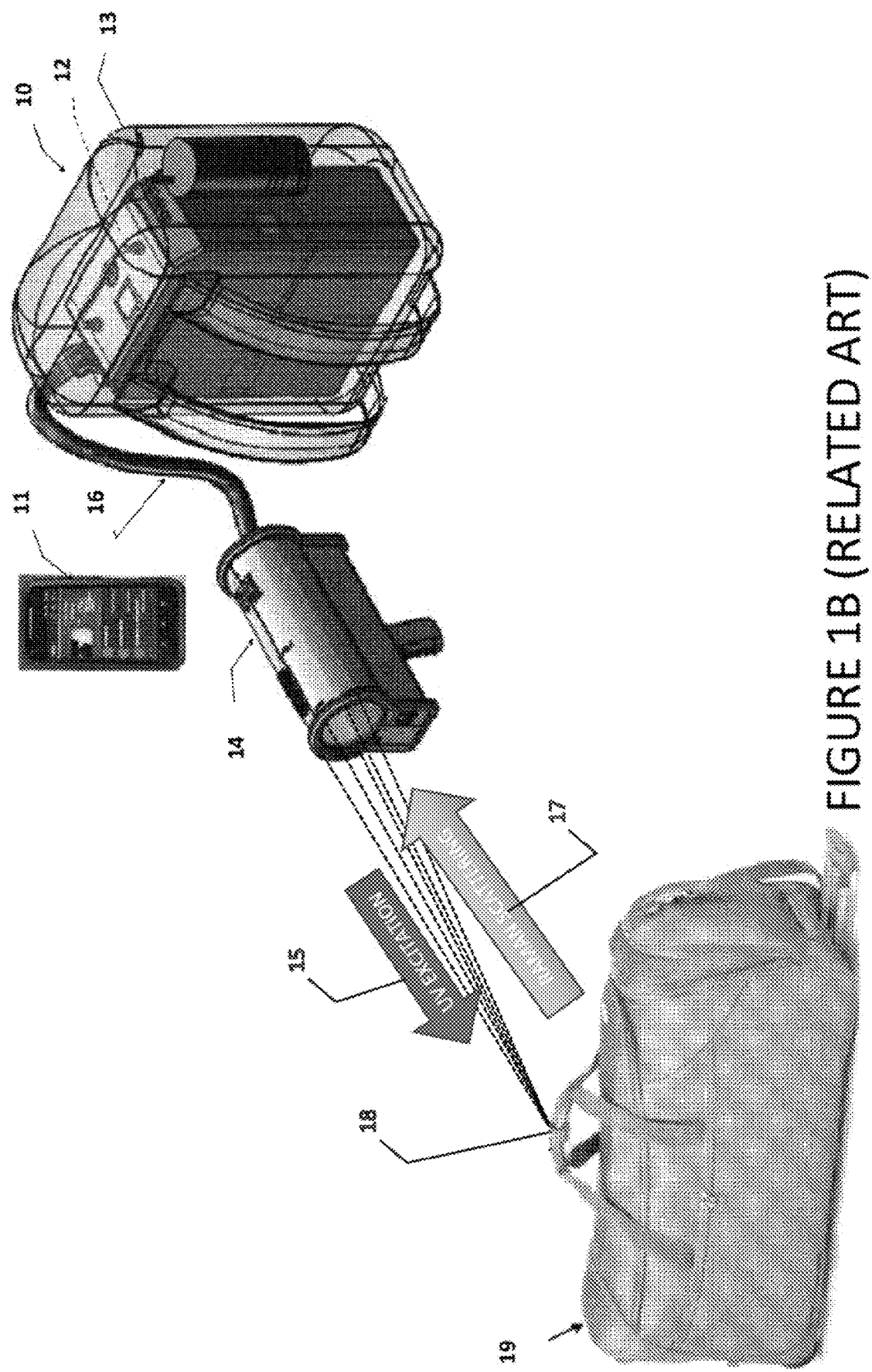
Figure 2:
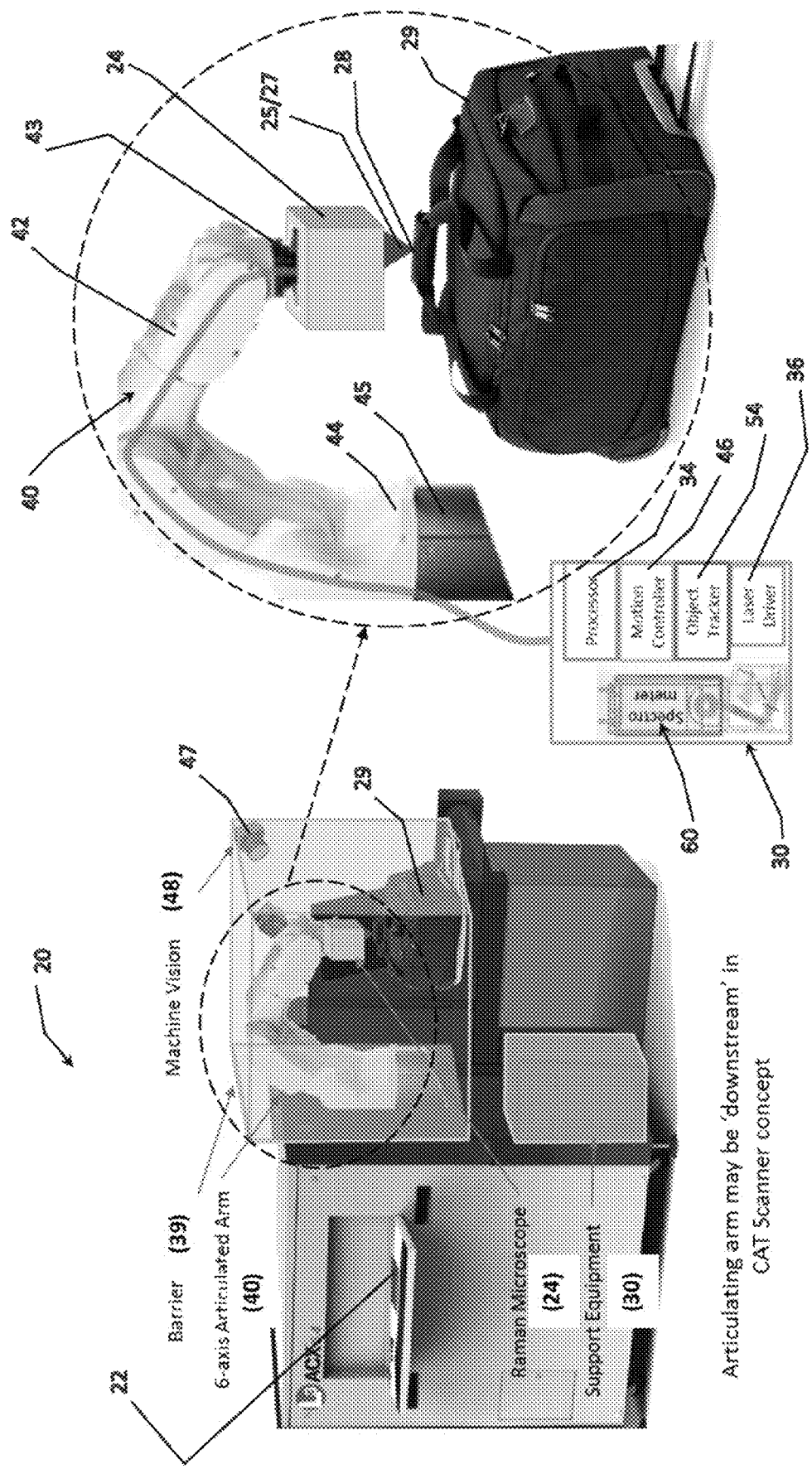
Figure 3:
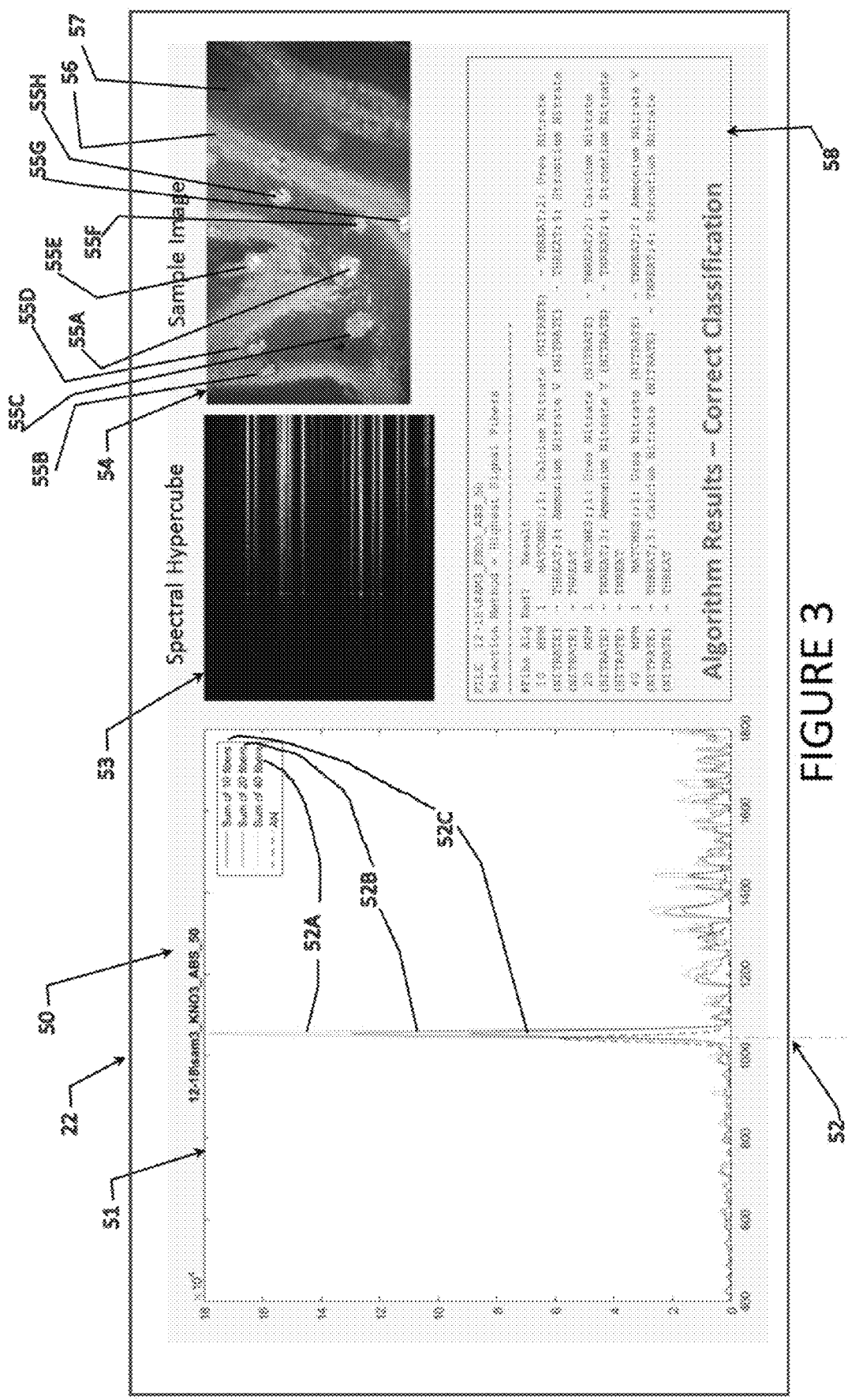

With particular reference to FIGS. 2 and 3, a UV Raman microscope analysis system 20 according to one embodiment of the invention is illustrated. In this example, an integrated machine includes a Raman microscope subassembly 24 which can generate both an excitation source beam 25 focused to point 28 on target 29 as well as collect Raman scattering 27 (similar to 15 and 17 of FIG. 1B). A platform or receiver is presented on which a target 29 can be supported with at least most of its unsupported sides exposed. A shroud or barrier 39 can be adjustable to surround and enclose target 29 and Raman microscope 24 during operation for eye safety.

We researched utilizing a UV Raman microscope to enable low level detection (nanograms) of explosive particles. An overall system concept is shown in FIG. 2.

1. Raman Microscope Scanning Method

Classical Raman microscopes are designed to look like a standard optical microscope in which the sample is moved relative to the instrument. This works well for flat samples. However, in this embodiment, the scanning mechanism is for the optical instrument to move relative to the sample with the use of an articulated arm as shown in FIG. 2. The advantages of this approach include at least:
  a. It allows for the sample to either be stationary or moving at a slow rate of speed.
  b. It allows for scanning of irregular 3-D surfaces as most real-world objects are.
  c. It allows for access to a larger surface are or portion of the sample than a standard line-of-sight optical system.

2. Use of Non-Spatial Raman Imaging for Fluorescence Rejection:

The owner of the present application has previously disclosed the details of the concept (application U.S. Ser. No. 16/151,682 filed Oct. 4, 2018, incorporated by reference for background information). Embodiments of the present invention can optionally employ that concept to further minimize fluorescence interference. FIG. 3 shows detection of a ~130 ng particle of Potassium Nitrate (KNO3) on black plastics ABS (a fluorescent substrate). Without this approach the key signal corresponding to the KNO3 would not be detectable. But other Raman set-ups can be used.

FIG. 3 shows proof-of-concept data taken on a UV Raman microscope setup showing detection of a ~130 ng KNO3 particle.

Further aspects of the generalized embodiment follow.

The platform or receiver to support a target 29 can be static (e.g. a tabletop, a bench, a surface, or the like). However, it might also be a conveyor (see diagrammatic depiction in FIG. 4A). A conveyor could move a target, or a series of successive different targets, past an interrogation zone. It could be a conveyor belt that is synchronized with acquisition of Raman signal from each target as it moves by the interrogation zone.

System 20 includes a user interface with a display 22. It can include a keyboard, touch screen, or other user controls. It also includes support equipment 30. In an enclosure box, as indicated in FIG. 2, support equipment 30 can include a spectrometer 60, processor 34, laser driver 36, motion controller 46, and object tracker 54.

It is to be understood that spectrometer 60 could be as is disclosed in detail in any of its embodiments in incorporated by reference co-pending co-owned Ser. No. 16/151,682 or other.

As indicated in FIG. 2, Raman microscope 24 is at the distal end of robotic arm 40 that has six-axis articulation or degree of freedom of movement (DFOM). A connection 43 at distal section 42 of arm 40 allows Raman microscope to be electromechanically moved in almost any aiming orientation for beam and collection field of view 25/27 relative to target 29, at least as to surfaces of target 29 that are exposed and not on a supporting surface. As can be appreciated, alternatively, there could be some sort of suspension system to suspend 3-D target 29 so that even under surfaces could be reached by articulated arm 40. Proximal end 44 of arm 40 is mounted on a mount 45 that is fixed relative to the station 20.

As can be appreciated by those skilled in the art, robotic arm 40 can be controlled in a number of ways. In this embodiment, machine vision subsystem 48, with a digital camera 47 with field of view over the range of relevant positions within barrier 39, could track the distal end of arm 40 and Raman microscope 24 in 3-D space, convert its coordinates to camera space, and inform motion controller 46 and processor 34 of actual physical location in real space. This could allow a human operator at user interface 22 to manually control scanning of the excitation beam 25 relative to target 29. It also could allow, through appropriate machine vision algorithms and software, for there to be an automated scanning of many if not all exposed surfaces of target 29. Furthermore, by appropriate machine vision algorithms, image recognition could be used for the machine vision system to recognize preprogrammed shapes or features of a target and only scan or focus in unrecognized preprogrammed such features.

It can also automatically sense distance from any target 29 within the interrogation zone and the reach of arm 40. This can be by one or more proximity sensors on or associated with arm 40 or the interrogation zone. It could be by a component such as a range finder. It could be by evaluation of imaging of the target (e.g. use of depth information in acquired digital images). Proximity sensing allows automatic or semi-automatic control of how close Raman microscope 24 is relative to any surface of target 29, including down to centimeter and even millimeter scale. This can enhance the ability of the system to focus to very small areas of the target surface and acquire highly magnified field-of-view images that can be effectively evaluated for Raman content.

Such machine vision systems, motion controllers, object trackers, and algorithms for machine vision and motion control are available from a wide variety of commercial sources.

Again, in this embodiment, Raman microscope 24 can be a version as disclosed in incorporated by reference U.S. Ser. No. 16/151,682. As disclosed therein, it uses a technique to obtain high resolution of very small physical space areas to help get good Raman signal for small areas. As such, utilizing the same can enhance and promote microscopic detection of chemical species of interest. This can include micro scale and even nano scale. By using appropriate optics, collected Raman scattering can be digitally imaged at a resolution that helps, on a pixel by pixel basis, isolate very small regions of the field of view from which Raman scattering is collected towards this purpose. It is to be understood, however, that alternative Raman microscopes can be used.

Again, utilizing the above features could allow an efficient and effective interrogation of all exposed surfaces of a three-dimensional target automatically. As can be appreciated, alternatively, just certain portions of a target could be scanned. One example might be, as shown in FIG. 2, just the handle of a duffel bag. This might have a higher probability of containing minute (even nano scale) particles related to explosives such as might be transferred from the handler of the explosive hand to the handle when the duffel bag is carried.

Furthermore, system 20 could allow an almost fully automated scanning of a target including three-dimensional target without a human user having to reposition either the target or the Raman microscope.

As indicated in FIG. 2, a rough analogue would be a medical imager such as an MIll or CT scanner. Programming can intelligently manipulate the aiming direction field of view over 3-D surfaces. This would allow barrier 39 to cover the entire target during a scan for safety reasons. Additionally, personnel could multitask to other tasks while the scanning is occurring. Programming could, however, issue an alarm and stop the scanning process immediately upon an indication of a chemical species of interest. The designer could select how the scanning proceeds.

FIG. 3 gives one example of a possible display at the user interface 22. In this example, related to scanning for potassium nitrate (KNO3), a chemical species that could be related to explosives, during the scan a user interface could include at displayed content 50, a section that shows concentration in the spectral area related to KNO3. See in window 51 reference numeral 52 and various indicated levels of KNO3 at 52A, B, and C related to the number of pixels based on bundled optical fibers according to the detection process of co-pending Ser. No. 16/151,682. As can be seen, the more optical fibers utilize the higher the intensity of the Raman signal for the spectra related to KNO3. As such, the higher the intensity the better the ability to distinguish it from noise or irrelevant content added around that spectral band. Details of this proof-of-concept results are as follows.

In the example of FIG. 3, based on an actual test where the sample included KNO3 (potassium nitrate) the duffel bag substrate is ABS, the distance between explosive particles. The focal distances at or approximately 1 inch, KNO3 particles on the order of a diameter of 52 μm and on a mass on the order of 133 nanograms were detected at 52A-C over an interval time of 500 ms. As such, this proof of concept shows that the combination of being able to position the Raman microscope close to but offset from any orientation on an exposed 3-D surface was capable of detecting at a nano scale level a chemical species of interest.

FIG. 3 also shows that if configured accordingly, user display 22 could also show spectral hyper-cube 53, a sample actual greatly magnified image of the sampling area, including an area 54, but also it could show optionally with graphics (here an overlaid red circle) the specific focus of interrogation for a single micro or nano scale particle 55A (of many such possible particles 55B-H). This could help a user see the nature of what is being scanned and detected and help quality control by distinguishing it from, for example, background 57 or other materials 56. FIG. 3 also shows that data 58 relating to the scan could also be displayed. This shows that according to the algorithm used, specific information about an indication of a correct classification of a chemical species of interest (here an explosive threat) was identified. This could be documented and stored as for evidentiary purposes.

It can therefore be seen that the invention achieves at least one or more of its stated objectives. Balancing competing factors such as cost, complexity, speed of detection, accuracy of detection, safety of humans, and the like, the system 20 improves over bench top systems that are static relative to excitation aiming and field of view and require relatively flat surfaces to get any significant chance of accurate and reliable detection. It also takes away some human error when having hand-held manual aiming of the microscope. It furthermore has been shown to have capabilities of effectively and efficiently interrogating a wide variety of targets including those of substantial 3-D form factor with detection of micro and nano scale traces of chemical species of interest. As such, this could be highly beneficial for effective and efficient semi-automated or automated screening such as for security purposes.

C. Enhancement Options

The generalized system of FIGS. 2 and 3 could include some optional enhancements. A first example is discussed below.

1. Optical Design Details

Two optical designs can be used with the system 20, each of which has advantages and disadvantages. They are described below.

In this optional optical set-up for generalized embodiment 20, the UV Raman microscope 24 utilizes a reflective objective with a 25 mm working distance to the target. The output is collimated and spectrally split using dichroic optical elements. A visible portion is directed to an operator camera with its own focus lens to provide a highly magnified view of the target area. The Raman band is directed to a fiber bundle at the focus of another lens.

Approach 1: Coaxial UV Laser Illumination Set-Ups 60A and 60B

With particular reference to FIGS. 4A and B, a laser source 68 generates a 262 nm deep UV laser 67 which is collimated and injected into the objective 74 optical axis with a long pass dichroic 66. The laser is further reflected by a long pass dichroic 72 into the reflective objective 74 (see FIGS. 4A and B, versions 1 and 2). The objective 74 is focused at the target 29 which results in a laser spot 28 measuring a few tens of microns in diameter. It is to be understood other UV wavelengths are possible, for example, UV wavelengths in the approximate range of ~220-266 nm are envisioned. See FIG. 4A. The main difference between the set-ups of FIGS. 4A and B is that set-up 60A of FIG. 4A uses an imaging spectrometer and ICCD (integrated charge-coupled device) 62A as in U.S. Ser. No. 16/151,682, whereas set-up 60B of FIG. 4B uses a different spectrometer and imager. As will be understood, principles of the generalized embodiment and this optional enhancing feature can be applied to different types of imaging spectrometers.

Further details about set-ups 60A and B follow.

With specific reference to FIG. 4A, a specific optical set up for Raman microscope 24 is shown at 60A. An imaging spectrometer and ICCD (integrated charge-coupled device) using the circular to linear fiber-optic arrangement of co-pending Ser. No. 16/151,682, could be optically connected via cabling as shown in FIG. 4A. The bundle optical fiber cable from 62A would collect return electromagnetic energy at 65 that would be focused on those bundled ends 63 by focusing lens 64. Laser beam 67 would excite Raman scattering by directing beam 67 from deep UV laser source 68 to dicrotic mirror 66. It would move at 69 to long pass dicrotic 72 and into focusing lens 74. As such deep UV Raman 73 would be excited via the focus beam 25 on a small area of 28 of target 29. As shown, in this example the robotic arm would position the interrogation beam close to spot 28 on target 29 regardless of orientation of that handle in 3-D space.

The return scattering 27 would pass into the field of view of lens 74, go back at 73 and reflect off dicrotic 72 at 69 and 65 into lens 64 for focusing on the ends of fiber-optic cable 62A for imaging and Raman content extraction.

Note, moreover, that this set up also allows visible light in the field of view of lens 74 to pass through dicrotic 72 at visible wavelengths at 81 and through lens 82 at 83 to visual band camera 84 (see subsystem 80 of FIG. 4A). This could produce the sample image 54 in FIG. 3 for human viewing or storage for documentation or quality control or for other purposes as disclosed herein.

FIG. 4B is a slight alternative to FIG. 4A with the same or similar components of FIG. 4A, except for the spectrometer. Any effective spectrometer 62B with fiber coupling could be used with a similar set up to FIG. 4A. A nominally collimated deep UV laser beam 67 can be used. This similarly could use the robotic arm for beneficial positioning close to the target 29 as well as provide a visual band recordation of any part of the scan.

Approach 2: Oblique UV Laser Illumination Set-Up 60C

Alternatively, in the set-up 60C as in FIG. 4C, the 262 nm laser 67' from laser generator 68' is collimated and projects the beam 67' onto the target 29 at the closest possible angle to the microscope axis. A discrete focus lens is the final element in the laser path. The lens is mounted to a focus adjust stage (not shown but commercially available) which provides a means to vary the size of focus spot 28 on the target 29 (see FIG. 3C). Laser line rejection filter 66' can replace dichroic 66 of FIG. 4A because of direct aiming of laser 67' to target 29. Other components of 60C can be the same or similar to 60A or 60B. Return scattering 69' is passed back to spectrometer 62A (or 62B).

Relative Advantages of the Above-Approaches

The coaxial focus (60A or 60B of FIG. 4A or B respectively) provides a tight focus spot 28 driven by the f number of the objective 74. This can be used to limit background illumination fluorescence. As the objective is an axis design, the laser will lose energy from the secondary obscuration.

The direct focus layout 60C of FIG. 4C eliminates a dichroic from the Raman optical path which improves throughput due to coating inefficiency. It also provides a means to vary spot 28 size on the target 29 as a means to reduce irradiance level which can ablate and degrade the target signature. The spot size on the target depends on the f number of lens which in turn must accommodate physical clearances created by the reflective objective 74. An optimized design would attempt to match the f number of the objective 74 which will require customized fixtures to hold the focus lens as close as possible to objective housing.

Thus, FIG. 4C is a still further alternative for the optical set up 60C according to the generalized invention. It is basically a similar set up to FIG. 4A with the following major difference. Instead of the excitation beam being injected into the optical path through a dicrotic mirror, it is directly aimed at the focusing point of optic 74.

Unique Focusing Approaches

Ensuring the Raman channel is in focus for a given sample is vital to optimizing return signal in Raman Microscopy. Various techniques that could be used with the generalized embodiment 20 are listed below 1) Use of a Standard Rangefinder
   a) A standard rangefinder (commercially available and diagrammatically indicated in FIG. 4C) can provide accurate measurements with millimeter level precision. Using this range, a characteristic equation 90 can be developed to precisely move the focusing optics into position (see FIG. 5). For example, actual position data 91 can be collected. Range finder readings can be correlated to robotic arm 40 positions 94 (e.g. by recording/extracting in coder counts for motion controller 46 which has the electrical motors or actuators that move arm 40. The equations/curve fittings 92/93 thus extrapolate a continuum of ranges correlated to arm position that can be used for actual focusing. For any given range, each focusing stage will have a unique position that will be predetermined. Such a range finder would be operatively connected to the system processor to inform it of distance between the distal end of objective 74 and the target 29. The characteristic developed from the curves of FIG. 5 can then be used to move focusing components of the system.

2) Use of the visual channel

With reference to FIGS. 6-7 an optional alternative to focusing is illustrated. Its operation would be as follows.
   a) Through the visual channel (e.g. using visual band camera subsystem 80), blurriness of an acquired image can be observed. Blurriness is generally subjective, but prior research has shown that by using a variation of the Laplacian, a relative number can be produced to represent blurriness of an image. Maximizing this value as the focusing optics move can generate a focused visual channel which would correspond to a focused Raman channel (see FIGS. 6 and 7). This is performed by:

(1) initially focus the optics of the system (FIG. 6, 100A);
(2) perform variance of the Laplacian on the image to get a blurriness score (e.g. 2.75 of FIG. 6), where the smaller the score the "blurrier" and less focused and the higher the score the sharper and more focused.
   (a) which can be done by convolving a single image channel with the Laplacian kernel, and then computing the variance of the result;
(3) move the focus optics in one direction;
(4) determine if blurriness score increased or decreased;
(5) If increased (e.g. FIG. 7 at 100B), continue moving in that direction until it decreases;
(6) if decreased, move in opposite direction until blurriness score decreases again;
(7) return to the position which the blurriness score was optimized.

In mathematics, the Laplace operator or Laplacian is a differential operator given by the divergence of the gradient of a function on Euclidean space. It is usually denoted by the symbols $\nabla \cdot \nabla$, $\nabla^2$ (where $\nabla$ is the nabla operator) or $\Delta$. The Laplacian $\nabla \cdot \nabla f(p)$ of a function f at a point p, is (up to a factor) the rate at which the average value off over spheres centered at p deviates from f(p) as the radius of the sphere shrinks towards 0. In a Cartesian coordinate system, the Laplacian is given by the sum of second partial derivatives of the function with respect to each independent variable. In other coordinate systems such as cylindrical and spherical coordinates, the Laplacian also has a useful form. Thus, this generation of a value related to "blurriness" can be used to enhance focusing of the system.

As will be appreciated, an automation of focus could be achieved. The system 20 could be automatically controlled to train or learn optimized focus for a given target location. By this "hunt and peck" technique enabled by the ability to move the Raman microscope electro-mechanically relative the target over minute (e.g. micrometer scale) increments, it could self-determine and optimize sharpness of image and take Raman measurement there. As uch this could enhance accuracy, precision, and efficiency of detection.

3) Use of a Stereoscopic Camera
   a) Using a visual band stereoscopic camera (e.g. camera 84 of subsystem 80) (commercially available), depth of field can be determined. These cameras are a combination of two cameras with predetermined specifications that look at an overlapping field of view. Depth is determined by utilizing the cameras' focal lengths, distance between the two cameras, pixel size, and difference in pixel position between the two camera images. Using this depth, a characteristic equation can be developed to precisely move the focusing optics into position. For any given depth, each focusing stage will have a unique position that will be predetermined.
      i) Depth is calculated based on the focal length of the two cameras, distance between the two cameras (see stereogram 110 of FIG. 8). As shown in FIG. 8, brighter objects 115A/115B are closer than darker objects 113A/113B or 114A/114B in left and right images 112A and 112B of FIG. 8.

3. Anti-Particle Ablation Control

Using a powerful, the focused laser beam 25/27 of system 20 comes with the need to control the amount of energy on samples (e.g. chemical species of interest) and substrates (e.g. the small target area(s) 28 on target(s) 29) to prevent ablation and damage. This is particularly important for interrogating sensitive samples that easily evaporate or burn off or interrogating samples that reside on expensive or important substrates like an expensive handbag. Techniques that can be used are listed below:

1) Controlling Laser On/Off time
   a) Custom firmware can precisely control when the laser turns on, and how long it stays on. The laser of system 20 can be controlled with 10 ms precision with capability of control down to 1 ms precision. As shown in Equations (1)-(3) below, energy density functions multiplicatively in relation to laser "on" time so, by reducing the amount of time the laser is on, a sample by 10x will result in a 10× reduction in energy density.

$$A_{circle} = (\pi/4) \times (\text{diameter})^2 \quad (\text{eq. 1})$$

$$\text{Power density (watts/m}^2) = \text{laser power (watts)/area}_{circle} \quad (\text{eq. 2})$$

$$\text{Energy density (J/m}^2) = \text{power density (watts/m}^2) \times \text{dwell time (s)} \quad (\text{eq. 3})$$

As such, using this technique can enhance and be beneficial in effectiveness of a system 20.

2) Reducing Power Density by defocusing the laser
   a) Focusing optics of system 20 are designed in such a way to allow for independent control of both the transmit and receive channels. This allows the "receive" Raman channel (the one which collects the Raman scattering for processing out of it a Raman signal) to remain in optimal focus while allowing the "transmit" laser (the excitation energy to the target 29) to be defocused to prevent ablation. As shown in the equation (2) above, if $\text{Area}_{(circle)}$ increases, power density decreases. This in turn causes energy density to also decrease. FIG. 9 shows the same laser beam in two different focus configurations. Although the overall output power of the laser is the same, the energy density of the bottom focused laser (see image 124 in FIG. 9) is nearly 12× that of the top defocused laser (see image 122 in FIG. 89).

4. Novel Control and Operator Feedback for Raman Microscope Chemical Detection:

The Raman Microscope Chemical Detection System disclosed herein provides more intuitive control and feedback via a large touchscreen display (see, e.g., display 22 of FIG. 2). It has advanced antiparticle ablation controls including laser on/off time and the ability to defocusing of the beam to reduce power density. See example display screens 130 and 150 of FIGS. 10 and 11). This stands out from state-of-the-art systems. The Raman Microscope Chemical Detection system disclosed herein can contain automatic scanning mode 131 and manual scanning mode 151 (FIGS. 10 & 11). In automatic scanning mode 131 of FIG. 10, the software application uses object recognition algorithm to identify in images 134 and 136 targeted area 135. In manual mode 151 of FIG. 11, the user may select the desired view 152 of the object and draw the bounding box 155 of the area to be scanned via touchscreen 22. The software application used with the system can provide the user with multiple views (134 and 136 of FIGS. 10 and 152 and 156 of FIG. 11) of the targeted object using wide angle cameras that covered 360° plus the bird's eye view. The application can display live feedback while the scanning process is in progress by distinctively overlaying results data over an image of the scanned object. Here, the overlays consist of a series of red/green squares 137 and 138 or 157 and 158 indicating threat/non-threat areas respectively. A user may zoom in on this overlay with a touchscreen gesture and tap on a particular square to access result details 140 and spectra plots (e.g. 142/142A) for that particular region and for textual information (e.g. 133, 143). The results overlay image can also be saved to the hard drive for future reference.

To summarize, the unique features of Raman Microscope Chemical Detection system and application disclosed herein, which can be used individually or in any combination, include at least the following:
1) Antiparticle ablation controls
   a. Laser on/off time
   b. Defocusing of the beam to reduce power density
2) Dual scanning mode, automatic and manual
3) Draw input bounding box for scanning via touchscreen
4) Full 360° view plus bird eye view of targeting object
5) Overlay object image with result feedback (display live and save to hard drive)
6) Access detailed information and spectra plots from image result.

Other feedback, information, or results can be displayed. See, e.g., ref. nos. 132, 133, 140, 142, 143 and 156.

D. Options and Alternatives

As emphasized above, the exemplary embodiments and their aspects are just a few examples of forms the invention and its aspects can take. For example, variations obvious to those skilled in this technical art will be included within the invention.

What is claimed is:

1. A method of detection of chemical species of interest on a target surface using Raman microscopy and spectroscopy comprising:
   a. interrogating a target for one or more chemical species of interest using a Raman microscope; and
   b. precisely electro-mechanically moving and orienting the Raman microscope relative to the target with multiple degrees of freedom of movement, including targets with 3-D form factors;
   c. further comprising selecting a type of focusing of the Raman microscope, wherein the type of focusing is one of:
      i. use of a range finder;
      ii. use of a visual channel comprising a quantification of blurriness in an acquired image related to sharpness of focus; and
      iii. use of a stereoscopic camera with overlapping field of view.

2. The method of claim 1 further comprising moving the Raman microscope into close proximity to target.

3. The method of claim 1 further comprising moving the Raman microscope across a surface of the target to scan the surface.

4. The method of claim 1 further comprising moving the target during the interrogation.

5. The method of claim 1 further comprising selecting a type of imaging spectroscopy for use with the Raman microscope.

6. The method of claim 1 further comprising selecting a type of optical set-up for the Raman microscope.

7. The method of claim 6 wherein the type of optical set up is selected from:
   a. a co-axial illumination of the target with collection of Raman scattering from the target; and
   b. an oblique illumination of the target with collection of Raman scattering along a different optical axis.

8. The method of claim 1 further comprising control of one or more of:
   a. on/off time of illumination by a laser for anti-particle ablation control;
   b. defocusing of illumination by a laser for anti-particle ablation control;
   c. scanning mode comprising one of automated or manual;
   d. display of field of view of the Raman microscope and other graphic or data content.

9. A Raman microscope analysis system comprising:
   a. an electro-mechanically controlled XYZ positioner;
   b. a Raman microscope adapted for collecting Raman scattering mounted on the XYZ positioner;
   c. an imaging spectrometer operatively optically connected to the Raman microscope for analyzing the collected Raman scattering for Raman content indicative of a chemical species of interest;
   d. a processor programmed to:
      i. control the XYZ positioner to adjust the Raman microscope and its orientation into proximity to and relative a target object;
      ii. illuminate the target with excitation illumination;
      iii. collect Raman scattering;
      iv. evaluate the collected Raman scattering for a chemical species of interest; and
   e. a user interface to select modes of operation of the system.

10. The system of claim 9 wherein the electro-mechanically controlled XYZ positioner comprises a 6-axis articulated arm.

11. The system of claim 9 wherein the Raman microscope comprises:
    a. a UV laser as an illumination source;
    b. a microscope objective lens;
    c. optics to direct collected Raman scattering to the imaging spectrometer.

12. The system of claim 9 wherein the imaging spectrometer comprises a CCD imager.

13. The system of claim 9 further comprising an interrogation space within the reach of the XYZ positioner.

14. The system of claim 13 further comprising one of:
    a. a platform for supporting a target object in the interrogation space; and
    b. a conveyor for moving a target object past the interrogation space.

15. The system of claim 9 wherein the Raman microscope comprises one of:
    a. a co-axial illumination of the target with collection of Raman scattering from the target; and
    b. an oblique illumination of the target with collection of Raman scattering along a different optical axis.

16. The system of claim 9 wherein the Raman microscope comprises a type of focusing from one of:
    a. a range finder;
    b. a visual channel comprising a quantification of blurriness in an acquired image related to sharpness of focus; and
    c. a stereoscopic camera with overlapping field of view.

17. The system of claim 9 wherein control of the excitation illumination comprises one or more of:
    a. on/off time of illumination by a laser for anti-particle ablation control;
    b. defocusing of illumination by a laser for anti-particle ablation control;
    c. scanning mode comprising one of automated or manual.

18. The system of claim 9 wherein the user interface includes a display of field of view of the Raman microscope and other graphic or data content.

* * * * *